United States Patent
Zhang et al.

(10) Patent No.: US 10,014,762 B2
(45) Date of Patent: Jul. 3, 2018

(54) PROTECTION CIRCUIT

(71) Applicant: Shenzhen China Star Optoelectronics Technology Co., Ltd., Shenzhen, Guangdong (CN)

(72) Inventors: Xianming Zhang, Guangdong (CN); Dan Cao, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 363 days.

(21) Appl. No.: 14/785,845

(22) PCT Filed: Aug. 21, 2015

(86) PCT No.: PCT/CN2015/087809
§ 371 (c)(1),
(2) Date: Oct. 20, 2015

(87) PCT Pub. No.: WO2017/016012
PCT Pub. Date: Feb. 2, 2017

(65) Prior Publication Data
US 2017/0163143 A1 Jun. 8, 2017

(30) Foreign Application Priority Data
Jul. 27, 2015 (CN) .......................... 2015 1 0445688

(51) Int. Cl.
*H02M 1/32* (2007.01)
*H02M 3/06* (2006.01)
*H02M 3/15* (2006.01)

(52) U.S. Cl.
CPC .............. *H02M 1/32* (2013.01); *H02M 3/06* (2013.01); *H02M 3/15* (2013.01)

(58) Field of Classification Search
CPC ............. H02M 1/32; H02M 3/06; H02M 3/15
See application file for complete search history.

(56) References Cited

U.S. PATENT DOCUMENTS 7,342,434 B2 * 3/2008 Wakayama ............... H03F 1/52
327/530
8,363,369 B2 * 1/2013 Lin ...................... H02H 7/1213
361/91.1
(Continued)

FOREIGN PATENT DOCUMENTS

CN 202014080 U 10/2011
CN 103066666 A 4/2013
(Continued)

*Primary Examiner* — Scott Bauer
(74) *Attorney, Agent, or Firm* — Andrew C. Cheng

(57) ABSTRACT

The invention provides a protection circuit applied in an inductive boost converter, the inductive boost converter includes a transmission circuit and a charging circuit, the protection circuit includes a detection circuit and a control circuit, an input terminal of the detection and an output terminal of the transmission circuit are connected, a first output terminal of the detection circuit and an input terminal of the charging circuit are connected, a second output terminal of the detection circuit and an input terminal of the control terminal are connected; the detection circuit detects whether an input current from the transmission circuit is a short-circuit current, if the circuit is shorted, the result will be sent to the control circuit, the control circuit cuts the connection of the charging circuit and ground, which can prevent charges stored in the charging circuit from flowing backward into the input terminal of the inductive boost converter.

8 Claims, 2 Drawing Sheets

(56) References Cited

U.S. PATENT DOCUMENTS

| | | | |
|---|---|---|---|
| 2002/0014943 A1 | 2/2002 | Sugiyama et al. | |
| 2006/0114631 A1 | 6/2006 | Li | |
| 2010/0201335 A1* | 8/2010 | Li | H02M 3/33507 323/284 |

FOREIGN PATENT DOCUMENTS

| | | |
|---|---|---|
| CN | 103166442 A | 6/2013 |
| CN | 103260314 A | 8/2013 |
| CN | 103606884 A | 2/2014 |
| CN | 104052260 A | 9/2014 |
| TW | M463010 U | 10/2013 |

* cited by examiner

PROTECTION CIRCUIT

CROSS REFERENCE

The invention claims priority from Chinese patent application No. CN201510445688.9, which is filed Jul. 27, 2015 and entitled "Protection circuit", the above-identified patent application is incorporated herein by reference in its entirety.

FIELD OF THE INVENTION

The invention relates to the field of power switch technology, and more particularly to a protection circuit.

BACKGROUND OF THE INVENTION

At present, inductive boost converters are widely employed in supplying power to white light emitting diodes (LEDs), the white light emitting diodes can provide backlight to liquid crystal display (LCD) panels of battery-powered systems. The output voltage of an inductive boost converter is higher than the input voltage, including an inductor, a diode, a capacitor and a control switch, turning off the control switch can cause soar of currents passing the inductor; turning on the control switch can cause currents flow into the output capacitor through the diode. Since the capacitor stores currents from the inductor, the voltage of the output capacitor increases after several switch cycles that makes the output voltage higher than the input voltage. However, as soon as the diode is shorted, a vast amount of charges stored in the output capacitor will flow backward into the input terminal through the inductor. Taking the example of a pulse-width modulation (PWM) generator to explain the input terminal, the PWM generator is embedded with an integrated circuit, the integrated circuit in the PWM generator will be burnt down by the charges flowing backward into the input terminal so that the PWM generator cannot work properly, such as smoke and fire, which can be regarded as hidden risks.

SUMMARY OF THE INVENTION

Exemplary embodiments of the invention provides a protection circuit, which can prevent charges from flowing backward into the input terminal and improve security of an inductive boost converter.

An exemplary embodiment of the invention provides a protection circuit, which is applied in an inductive boost converter, the inductive boost converter includes a transmission circuit and a charging circuit, the protection circuit includes:

a detection circuit and a control circuit, an input terminal of the detection circuit and an output terminal of the transmission circuit are connected, a first output terminal of the detection circuit and an input terminal of the charging circuit are connected, a second output terminal of the detection circuit and an input terminal of the control circuit are connected;

the detection circuit detects whether an input current from the transmission circuit is a short-circuit current, if the circuit is shorted, the detection result will be sent to the control circuit, the control circuit cuts the connection of the charging circuit and ground, which can prevent the charges stored in the charging circuit from flowing backward into the input terminal of the inductive boost converter.

The transmission circuit includes an inductor and a diode, one end of the inductor of the transmission circuit is connected to an input terminal of the inductive boost converter, the other end of the inductor is connected to a cathode of the diode; the charging circuit includes at least one capacitor, each of the capacitors in the at least one capacitor are parallel connected with each other, a parallel connection output terminal of the charging circuit plays the role of an output terminal of the inductive boost converter;

The transmission circuit transmits charges to the charging circuit, the charging circuit stores the charges from the transmission circuit and generates an output voltage, the output voltage value is higher than the input voltage value of the input terminal.

The detection circuit includes an optical coupler, the optical coupler includes a light emitting diode and a triode, a cathode of the light emitting diode and an anode of the diode of the transmission circuit are connected, an anode of the light emitting diode and the input terminal of the charging circuit are connected;

the light emitting diode detects whether an input current from the transmission circuit is the short-circuit current, if the circuit is shorted, the light emitting diode will sent optical signals for triggering the triode to generate photocurrents, resulting in turning on the triode.

The triode is a NPN triode, base of the triode is controlled by the light emitting diode, a collector electrode of the triode is supplied with a constant voltage, an emitter of the triode is a second output terminal of the detection circuit, which is connected to the input terminal of the control circuit;

when the triode receives the optical signals, the photocurrents are generated and transported into the input terminal of the control circuit.

The control circuit includes a shunt resistance, a comparator and a field-effect tube, one end of the shunt resistance and the ground are connected, the other end of the shunt resistance and the second output terminal of the detection circuit are connected;

the shunt resistance shunts the photocurrents flowing into the input terminal of the control circuit.

The comparator includes a homogeneous phase input terminal, a reverse phase input terminal, a constant voltage terminal, a ground terminal and an output terminal, the reverse phase input terminal of the comparator and the second output terminal of the detection circuit are connected, the homogeneous phase input terminal of the comparator is supplied with a reference voltage, the output terminal of the comparator and a grid of the field-effect tube are connected;

when the reverse phase input terminal of the comparator receives the photocurrents after being shunted, the comparator will compare the voltage of the reverse phase input terminal of the comparator with the reference voltage, if the voltage of the reverse phase input terminal of the comparator is higher than the reference voltage, the output terminal of the comparator exports a low level to the grid of the field-effect tube.

The field-effect tube is a P groove reinforced field-effect tube, a drain electrode of the field-effect tube is connected to the charging circuit, a source electrode of the field-effect tube is connected to the ground;

when the field-effect tube receives the low level from the comparator, the field-effect tube shuts down and cuts the connection of the charging circuit and the ground, which can prevent the charges stored in the charging circuit from flowing backward into the input terminal of the inductive boost converter.

When the circuit is not shorted, the voltage of the reverse phase input terminal of the comparator is lower than the reference voltage, the output terminal of the comparator exports a high level, connecting the charging circuit and the ground to store the charges transferred by the transmission circuit in the charging circuit and generate the output voltage.

The input terminal of the inductive boost converter is a pulse-width modulation PWM generator.

An inductive boost converter provided by a second exemplary embodiment of the invention includes the protection circuit according to the first exemplary embodiment.

In exemplary embodiments of the invention, the detection circuit detects whether an input current from the transmission circuit is a short-circuit current, if the circuit is shorted, the control circuit cuts the connection of the charging circuit and the ground, which can prevent the charges stored in the charging circuit from flowing backward into the input terminal and burning the integrated circuit of the input terminal, so as to improve security of an inductive boost converter.

BRIEF DESCRIPTION OF THE DRAWINGS

For further description of the proposal of the invention or conventional technique, figures of exemplary embodiments are referred to be illustrated, obviously, the following figures are merely detailed description of the preferred embodiments, for those skilled persons in the art, various modifications and variations can be made according to the figures of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. For those skilled persons in the art, various modifications and variations can be made according to the invention, and therefore the invention needs not be limited to the disclosed embodiment.

Figure 1:
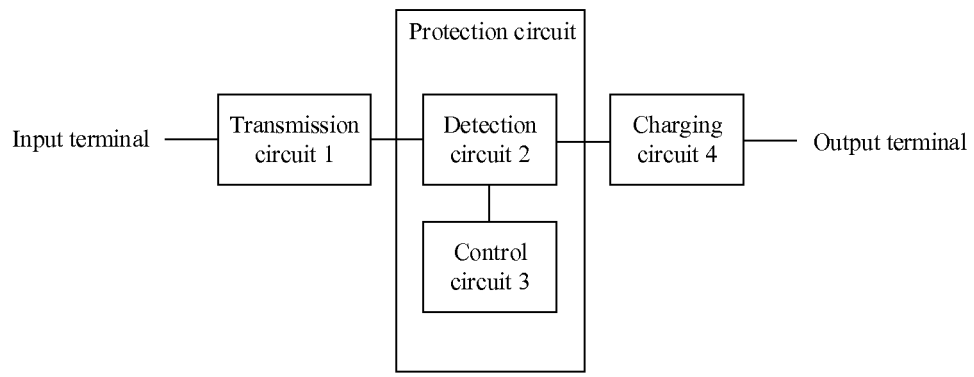
FIG. 1 is a schematic structural view of a protection circuit according to an exemplary embodiment of the invention.

Referring to FIG. 1, a schematic structural view of a protection circuit according to an exemplary embodiment of the invention, the protection circuit includes a detection circuit 2 and a control circuit 3, the detection circuit 2 and the control circuit 3 are connected between a transmission circuit 1 in a conventional inductive boost converter and a charging circuit 4. A schematic structural view of the conventional inductive boost converter refers to FIG. 2.

An input terminal of the detection circuit 2 and an output terminal of the transmission circuit 1 are connected, a first output terminal of the detection circuit 2 and an input terminal of the charging circuit 4 are connected, a second output terminal of the detection circuit 2 and an input terminal of the control circuit 3 are connected.

Specifically, the detection circuit 2 is connected between the transmission circuit 1 and the charging circuit 4, to be specific, the input terminal of the detection circuit 2 and the output terminal of the transmission circuit 1 are connected. The detection circuit 2 includes a first output terminal and a second output terminal, the first output terminal of the detection circuit 2 and the input terminal of the charging circuit 4 are connected, the second output terminal of the detection circuit 2 and the input terminal of the control circuit 3 are connected. Structures of the transmission circuit 1 and the charging circuit 4 refer to a schematic structural view of a conventional inductive boost converter shown in FIG. 2.

Figure 2:
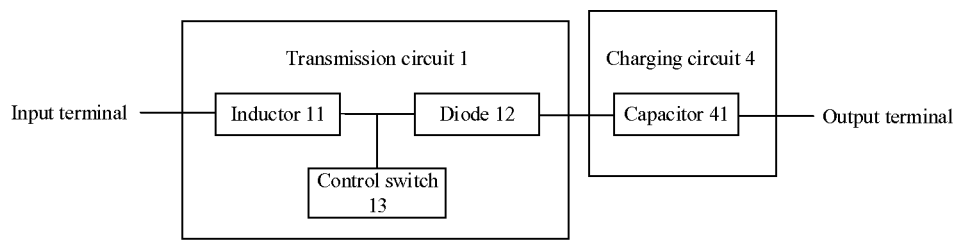
FIG. 2 is a schematic structural view of a conventional inductive boost converter.

Referring to FIG. 2, the transmission circuit 1 includes an inductor 11, a diode 12 and a control switch 13. The inductor 11 is an energy converter that can convert electrical energy to magnetic field energy or vice versa, when the control switch 13 is turned on, the inductor 11 will store magnetic field energy converted from electrical energy, when the control switch 13 is turned off, the inductor 11 will convert the stored magnetic field energy to electrical energy, and the electrical energy is filtered by the diode 12 and a capacitor 41 in the charging circuit after lapping with a voltage from the input terminal to achieve a stable direct voltage, in order to supply the output terminal. As the voltage is formed by overlap of the voltage of the input terminal and the electrical energy converted by magnetic field energy of the inductor 11, the voltage of the output terminal is higher than that of the input terminal, the conventional inductive boost converter completes the process of increasing voltage. A cathode of the diode 12 and the output terminal of the inductor 11 are connected, an anode of the diode 12 and the capacitor 41 are connected.

Optionally, the diode 12 is a Schottky diode, used as insulation, which means when the control switch is turned on, the voltage of the cathode of the diode 12 is lower than that of the anode, meanwhile, the diode 12 is reverse biased cut off to insulate storage of the inductor 11 from power supply to the output terminal by the capacitor 41. Because when the control switch 13 is turned off, overlapped energy passes the diode to supply electricity to load, at this point the diode 12 is forward directed, which requires the minimum forward voltage that can transport the most energy to the output terminal. However, as soon as the diode 12 is shorted to generate short-circuit currents, the diode 12 will be reverse conducted and equivalent to a wire, charges stored in the capacitor 41 can flow back towards the input terminal through the inductor and burn the integrated circuit in the input terminal, therefore, the detection circuit 2 and the control circuit 3 are inserted between the transmission circuit 1 and the charging circuit 4 in exemplary embodiments of the invention to prevent charges in the charging circuit from flowing back into the input terminal.

The detection circuit 2 detects whether an input current from the transmission circuit 1 is a short-circuit current, if the circuit is shorted, the detection result will be sent to the control circuit 3, the control circuit 3 cuts the connection of the charging circuit 4 and the ground, which can prevent the charges stored in the charging circuit 4 from flowing backward into the input terminal of the inductive boost converter.

Specifically, the detection circuit 2 detects whether an input current from the transmission circuit 1 is a short-circuit current. If the circuit is shorted, the detection circuit will sent the result to the control circuit 3, the control circuit 3 cuts the connection of the charging circuit 4 and the ground according to the result, which can insulate the charging circuit 4 and prevent the charges stored in the charging circuit 4 from flowing backward into the input terminal of the inductive boost converter. If the circuit is not shorted, the charging circuit 4 stores charges from the transmission circuit 1, which is charged by the output voltage that is higher than the input voltage.

In the exemplary embodiment of the invention, the detection circuit detects whether an input current from the transmission circuit is a short-circuit current, if the circuit is shorted, the control circuit cuts the connection of the charging circuit and the ground, which can prevent the charges stored in the charging circuit from flowing backward into the input terminal and burning the integrated circuit of the input terminal, as well as improving security of an inductive boost converter.

Figure 3:
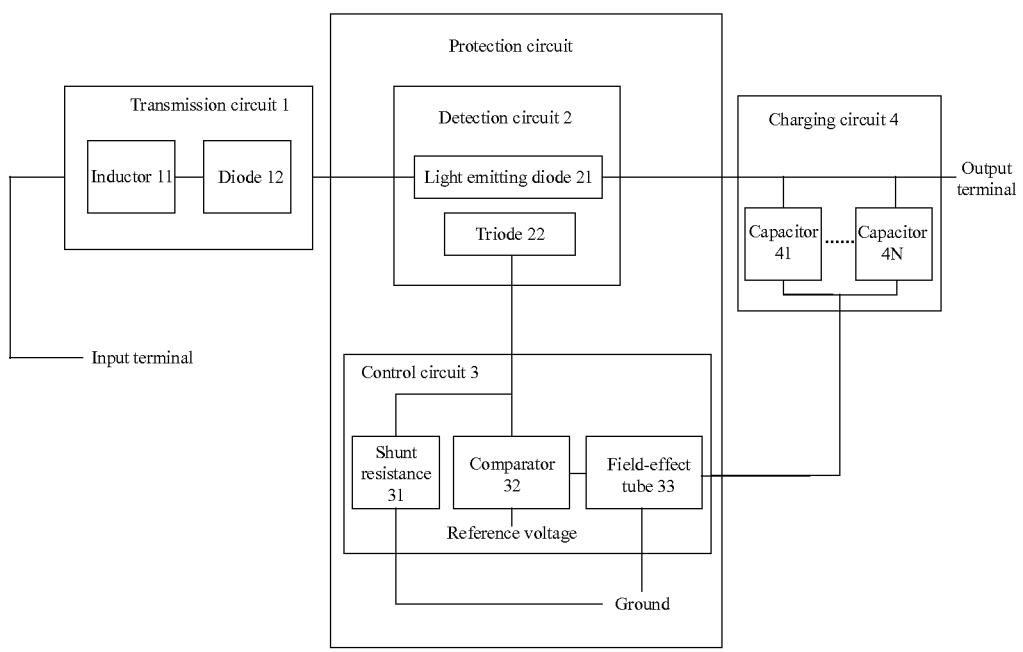
FIG. 3 is a schematic structural view of another protection circuit according to an exemplary embodiment of the invention.

Referring to FIG. 3, a schematic structural view of another protection circuit according to an exemplary embodiment of the invention, FIG. 3 provides further description to the protection circuit in FIG. 1. The detection circuit 2 in the protection circuit includes a light emitting diode 21 and a triode 22, the control circuit 3 in the protection circuit includes a shunt resistance 31, a comparator 32 and a field-effect tube 33.

The transmission circuit 1 includes an inductor 11 and a diode 12, one end of the inductor 11 is connected to the input terminal of the inductive boost converter, and the other end of the inductor 11 is connected to a cathode of the diode 12. The charging circuit 4 according to the exemplary embodiment of the invention includes at least one capacitor, corresponding to capacitors 41 to 4N in FIG. 3, each of the capacitors in the at least one capacitor are parallel connected with each other, a parallel connection output terminal of the charging circuit 4 is the output terminal of the inductive boost converter. The transmission circuit 1 also includes a control switch, which is not marked in FIG. 3, effect of the control switch is same with that of the control switch 13 shown in FIG. 2. Optionally, the input terminal of the inductive boost converter is a pulse-width modulation PWM generator. Optionally, the control switch can be integrated in the PWM generator.

The transmission circuit 1 transmits charges to the charging circuit 4, the charging circuit stores charges from the transmission circuit and generates an output voltage, the output voltage value is higher than the input voltage value of the input terminal.

The detection circuit 2 is an optical coupler, the optical coupler includes a light emitting diode 21 and a triode 22, a cathode of the light emitting diode 21 and an anode of the diode 12 of the transmission circuit 1 are connected, an anode of the light emitting diode 21 and the input terminal of the charging circuit 4 are connected. Optionally, the triode 22 is a light-sensitive triode.

Specifically, the light emitting diode 21 detects whether an input current from the transmission circuit 1 is the short-circuit current, which can be treated as the light emitting diode 21 checks whether the diode 12 is shorted, when the diode 12 is shorted, the light emitting diode 21 can detect the short-circuit. To be specific, in the optical coupler, when the value of currents flowing through the light emitting diode 21 is over a preset threshold value, the currents trigger the light emitting diode to emit light, which can impact the triode 22, the triode 22 generates photocurrents when receiving light by the photoelectric effect to turn on the triode 22. Short-circuited currents of the diode 12 can trigger the light emitting diode 21 to emit light. When the result of the light emitting diode 21 shows short circuit, the light emitting diode 21 will send optical signals to trigger the triode to generate photocurrents and turn on the triode.

The triode is a NPN triode, base of the triode 22 is controlled by the light emitting diode, a collector electrode of the triode 22 is supplied with a constant voltage, an emitter of the triode 22 is the second output terminal of the detection circuit 2, which is connected to the input terminal of the control circuit 3.

Specifically, when the triode 22 receives the optical signals and generates the photocurrents that are transported into the input terminal of the control circuit.

The control circuit 3 includes a shunt resistance 31, a comparator 32 and a field-effect tube 33, one end of the shunt resistance 31 and the ground are connected, the other end of the shunt resistance 31 and the second output terminal of the detection circuit are connected. The shunt resistance 31 shunts the photocurrents flowing into the input terminal of the control circuit 3.

The comparator 32 includes a homogeneous phase input terminal, a reverse phase input terminal, a constant voltage terminal, a ground terminal and an output terminal, the reverse phase input terminal of the comparator 32 and the second output terminal of the detection circuit 2 are connected, the homogeneous phase input terminal of the comparator 32 is supplied with a reference voltage, the output terminal of the comparator 32 and a grid of the field-effect tube are connected.

Specifically, when the reverse phase input terminal of the comparator 32 receives the photocurrents after being shunted, the comparator 32 compares the voltage of the reverse phase input terminal of the comparator with the reference voltage, if the voltage of the reverse phase input terminal of the comparator 32 is higher than the reference voltage, the output terminal of the comparator 32 exports a low level to a grid of the field-effect tube 33.

The field-effect tube 33 is a P groove reinforced field-effect tube, a drain electrode of the field-effect tube 33 is connected to the charging circuit 4, a source electrode of the field-effect tube 33 is connected to the ground;

Specifically, when the field-effect tube 33 receives the low level from the comparator 32, the field-effect tube 33 shuts down and cuts the connection of the charging circuit 4 and the ground, which can prevent the charges stored in the charging circuit 4 from flowing backward into the input terminal of the inductive boost converter.

When the circuit is not shorted, no voltage will be loaded on the reverse phase input terminal of the comparator 32, thereby the voltage of the reverse phase input terminal of the comparator 32 is lower than the reference voltage, the output terminal of the comparator 32 exports a high level, connecting the charging circuit 4 and the ground to store the charges transferred by the transmission circuit 1 in the charging circuit 4, resulting in generating the output voltage.

Figure 4:
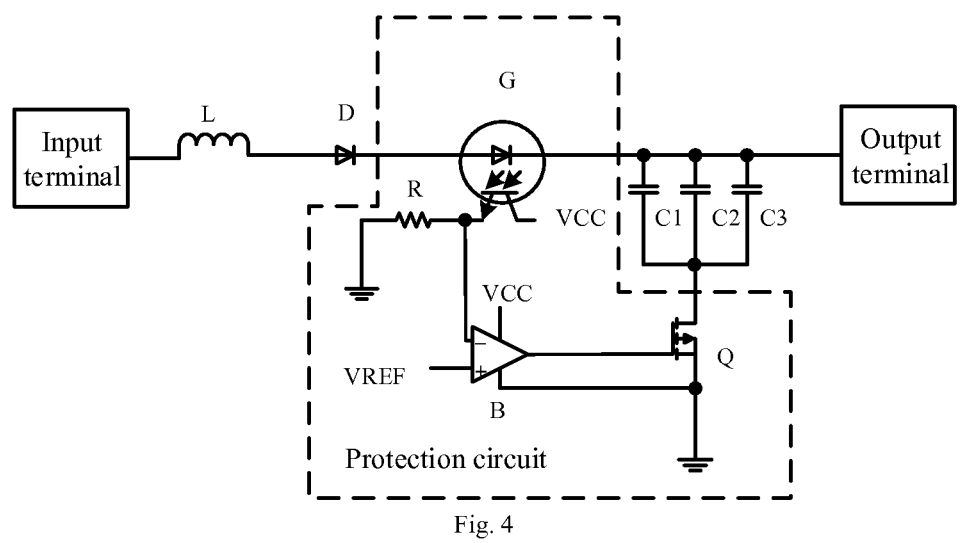
FIG. 4 is a circuit diagram of a protection circuit according to an exemplary embodiment of the invention.

Referring to FIG. 4, a circuit diagram of a protection circuit according to an exemplary embodiment of the invention, parts marked by dotted lines are components used in the protection circuit, including an optical coupler G, a shunt resistance R, a comparator B and a field-effect tube Q.

The optical coupler G is series connected between a diode D and a parallel connection capacitor unit, the parallel connection capacitor unit includes C1, C2 and C3. A cathode of the light emitting diode in the optical coupler G and an anode of the diode D are connected, an anode of the light emitting diode in the optical coupler G and an input terminal of the parallel connection capacitor unit are connected. Base of the triode in the optical coupler G receives optical signals from the light emitting diode, an emitter of the triode in the optional coupler G and a reverse phase input terminal of the comparator B are connected, a collector electrode of the triode in the optional coupler G is supplied with a constant voltage VCC. The emitter of the triode in the optional coupler G is the second output terminal of the detection circuit of the exemplary embodiment in FIG. 3, the anode of the light emitting diode in the optical coupler G is the first output terminal of detection circuit of the exemplary embodiment in FIG. 3, the cathode of the light emitting diode in the optical coupler G is the input terminal of the detection circuit of the exemplary embodiment in FIG. 3.

One end of the shunt resistance R and the emitter of the triode in the optional coupler G are connected, the other end of the shunt resistance R and the ground are connected.

A positive phase input terminal of the comparator B is supplied with a reference voltage VREF, the VREF takes different values in different circuits, but the VREF is a constant value. The comparator B also includes a constant voltage terminal and a ground terminal, the constant voltage terminal is supplied with a constant voltage VCC, the ground terminal of the comparator B and a source electrode of the field-effect tube Q are both connected to the ground.

A circuit consisting of the inductor L and the diode D corresponds to the transmission circuit 1 of the exemplary embodiment in FIG. 3, the parallel connection capacitor unit corresponds to the charging circuit 4 of the exemplary embodiment in FIG. 3.

During the procedure, when the diode D is shorted and generates short-circuit currents that transport to a light emitting diode in the optical coupler G, the current value of the short-circuit currents is higher than current threshold triggering the light emitting diode to emit light, when the light emitting diode detects the short-circuit currents, optical signals are generated and impact the triode in the optical coupler G, the triode converts light energy to electrical energy and generates photocurrents, and turns on the triode, the triode transports the photocurrents to the shunt resistance R and the comparator B by the emitter.

When the photocurrents are huge, the shunt resistance B shunts the photocurrents to avoid damage of the comparator B by heavy currents. Another part of the photocurrents after being shunted is transported to a reverse phase input terminal of the comparator, the comparator B compares the voltage of the reverse phase input terminal with the VREF, when the voltage of the reverse phase input terminal is lower than the VREF, the output terminal of the comparator exports a high level; when the voltage of the reverse phase input terminal is higher than the VREF, the output terminal of the comparator exports a low level. In the exemplary embodiment of the invention, when the diode D is shorted, the voltage of the reverse phase input terminal of the comparator B is higher than the VREF, which can transport a low level to the grid of the field-effect tube from the output terminal of the comparator B.

The field-effect tube Q is a P groove reinforced field-effect tube, a source electrode of the field-effect tube Q is connected to the ground; a drain electrode of the field-effect tube Q is connected to the parallel connection capacitor unit. The field-effect tube Q controls the connection of the parallel connection capacitor unit and the ground. When the field-effect tube Q is turned on, the parallel connection capacitor unit and the ground are connected; when the field-effect tube Q is turned off or cut off, the parallel connection capacitor unit and the ground are disconnected, the parallel connection capacitor unit is insulated, charges stored in the parallel connection capacitor unit will not move towards the inductor L. When voltage Vgs of the grid and the source electrode of the field-effect tube Q is lower than a preset value, the field-effect tube Q will be turned on, the preset value can be a minus.

When the grid of the field-effect tube Q receives the low level from the output terminal of the comparator B, as the source electrode of the field-effect tube Q and the ground are connected, voltage values of Vg and Vs are both zero, which make the Vgs is larger than the preset value, the field-effect tube is turned off and the parallel connection capacitor unit and the ground are disconnected and insulated, preventing charges stored in the parallel connection capacitor unit from flowing back into the input terminal of the inductive boost converter.

When the diode D works properly, a light emitting diode in the optical coupler G does not emit light and hence a triode in the optical coupler G does not generate the photocurrents, the voltage value of the reverse phase input terminal of the comparator B is zero, which is lower than the VREF, therefore, the output terminal of the comparator B exports a high level to the grid of the field-effect tube Q, turning on the field-effect tube Q and connecting the parallel connection capacitor unit to the ground. The parallel connection capacitor unit can store the charges transported by the inductor and generate an output voltage.

In the exemplary embodiment of the invention, an optical coupler, a shunt resistance, a comparator and a field-effect tube are added to prevent charges stored in the parallel connection capacitor unit from flowing back into the input terminal and burning the integrated circuit of the input terminal, which can improve security of an inductive boost converter.

Figure 5:
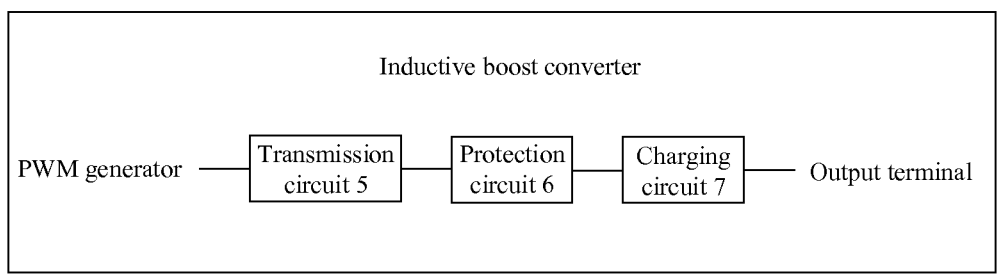
FIG. 5 is a schematic structural view of an inductive boost converter according to an exemplary embodiment of the invention.

Referring to FIG. 5, a schematic structural view of an inductive boost converter according to an exemplary embodiment of the invention, the inductive boost converter includes a PWM generator, a transmission circuit 5, a protection circuit 6, a charging circuit 7 and an output terminal.

The PWM generator supplies the inductive boost converter with an input voltage, under the circumstances that output frequency of the control circuit is constant, the PWM generator supplies the circuits of the inductive boost converter with a constant voltage by adjusting its duty ratio through voltage feedback.

The structural view and procedure of the transmission circuit 5 and the charging circuit 7 can refer to description of the transmission circuit 1 and the charging circuit 4 of the exemplary embodiment in FIG. 2 and repetitious details are skipped here.

The structural view and procedure of the protection circuit 6 can be referred to description of the protection circuit of the exemplary embodiment in FIG. 3 and repetitious details are skipped here.

The inductive boost converter according to the exemplary embodiment in FIG. 5 can prevent charges stored in the charging circuit from flowing back into the PWM generator and burning the integrated circuit in the PWM generator, which can improve security of an inductive boost converter.

People skilled in the art can understand and simulate all or part process of the previous exemplary embodiments by operating computer programs to control relating hardware, the programs can be stored in a computer-readable storage medium, when the program is executed, the process according to exemplary embodiments above can be included. The computer-readable storage medium can be a disk, a compact disc, a read-only memory (ROM) or a random access memory (RAM), etc.

The embodiments are preferred chosen and described in order to best explain the present invention, it is not intended to be exhaustive or to limit the invention to the precise form or to exemplary embodiments disclosed. The scope of the invention is defined by the claims appended hereto and their equivalents in which all terms are meant in their broadest reasonable sense unless otherwise indicated.

What is claimed is:

1. A protection circuit, applied in an inductive boost converter, the inductive boost converter comprising a transmission circuit and a charging circuit, wherein the protection circuit comprises a detection circuit and a control circuit, an input terminal of the detection circuit and an output terminal of the transmission circuit are connected, a first output terminal of the detection circuit and an input terminal of the charging circuit are connected, a second output terminal of the detection circuit and an input terminal of the control circuit are connected;

the detection circuit detects whether an input current from the transmission circuit is a short-circuit current, if the circuit is shorted, the detection result will be sent to the control circuit, the control circuit cuts the connection of the charging circuit and ground, which prevents charges stored in the charging circuit from flowing backward into the input terminal of the inductive boost converter, wherein the transmission circuit comprises an inductor and a diode, one end of the inductor of the transmission circuit is connected to an input terminal of the inductive boost converter, the other end of the inductor is connected to a cathode of the diode; the charging circuit comprises at least one capacitor, each of the capacitors in the at least one capacitor are parallel connected with each other, a parallel connection output terminal of the charging circuit is the output terminal of the inductive boost converter; the transmission circuit transmits charges to the charging circuit, the charging circuit stores the charges from the transmission circuit and generates an output voltage, the output voltage value is higher than the input voltage value of the input terminal;

wherein the detection circuit comprises an optical coupler, the optical coupler comprises a light emitting diode and a triode, a cathode of the light emitting diode and an anode of the diode of the transmission circuit are connected, the anode of the light emitting diode and the input terminal of the charging circuit are connected; the light emitting diode detects whether an input current from the transmission circuit is the short-circuit current, if the circuit is shorted, the light emitting diode will sent optical signals for triggering the triode to generate photocurrents, resulting in turning on the triode.

2. The protection circuit according to claim 1, wherein the triode is a NPN triode, base of the triode is controlled by the light emitting diode, a collector electrode of the triode is supplied with a constant voltage, an emitter of the triode is a second output terminal of the detection circuit, which is connected to the input terminal of the control circuit;

when the triode receives the optical signals, the photocurrents are generated and transported into the input terminal of the control circuit.

3. The protection circuit according to claim 2, wherein the control circuit comprises a shunt resistance, a comparator and a field-effect tube, one end of the shunt resistance and the ground are connected, the other end of the shunt resistance and a second output terminal of the detection circuit are connected;

the shunt resistance shunts the photocurrents flowing into the input terminal of the control circuit.

4. The protection circuit according to claim 3, wherein the comparator comprises a homogeneous phase input terminal, a reverse phase input terminal, a constant voltage terminal, a ground terminal and an output terminal, the reverse phase input terminal of the comparator and the second output terminal of the detection circuit are connected, the homogeneous phase input terminal of the comparator is supplied with a reference voltage, the output terminal of the comparator and a grid of the field-effect tube are connected;

when the reverse phase input terminal of the comparator receives the photocurrents after being shunted, the comparator compares the voltage of the reverse phase input terminal of the comparator with the reference voltage, if the voltage of the reverse phase input terminal of the comparator is higher than the reference voltage, the output terminal of the comparator exports a low level to the grid of the field-effect tube.

5. The protection circuit according to claim 4, wherein the field-effect tube is a P groove reinforced field-effect tube, a drain electrode of the field-effect tube is connected to the charging circuit, a source electrode of the field-effect tube is connected to the ground;

when the field-effect tube receives the low level from the comparator, the field-effect tube shuts down and cuts the connection of the charging circuit and the ground, which prevents the charges stored in the charging circuit from flowing backward into the input terminal of the inductive boost converter.

6. The protection circuit according to claim 5, wherein when the circuit is not shorted, the voltage of the reverse phase input terminal of the comparator is lower than the reference voltage, the output terminal of the comparator exports a high level, which connects the charging circuit to the ground and store the charges transferred by the transmission circuit in the charging circuit, resulting in generating the output voltage.

7. The protection circuit according to claim 1, wherein the input terminal of the inductive boost converter is a pulse-width modulation PWM generator.

8. An inductive boost converter, comprising the transmission circuit and the charging circuit, wherein the inductive boost converter also comprises the protection circuit according to claim 1.

* * * * *